July 19, 1932.  W. B. TOWELL  1,867,718
SEALING RING
Filed April 16, 1930
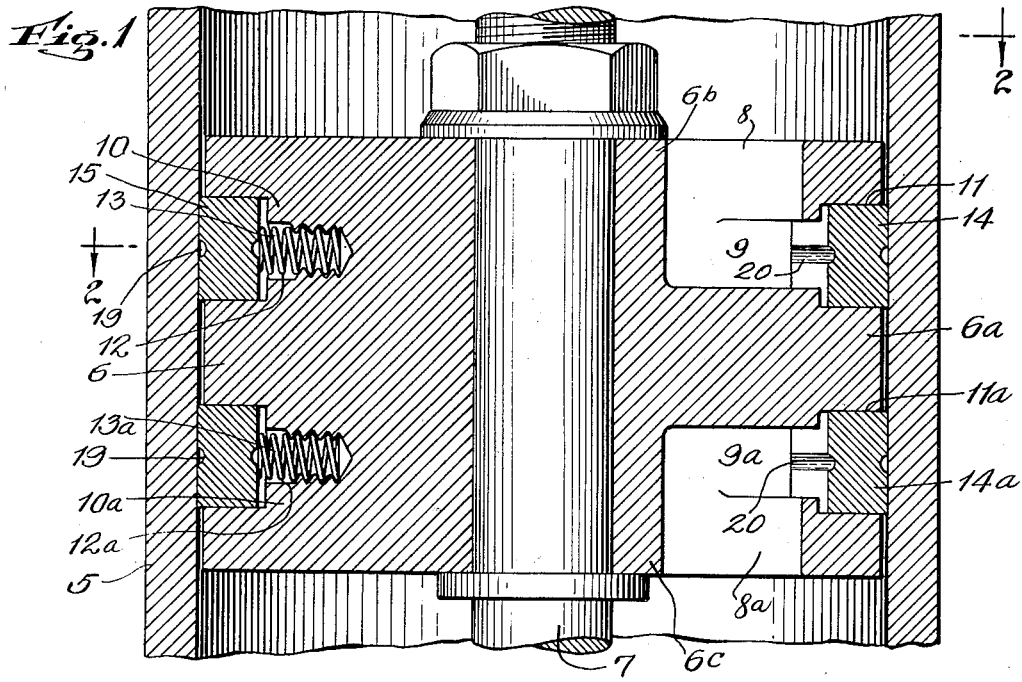
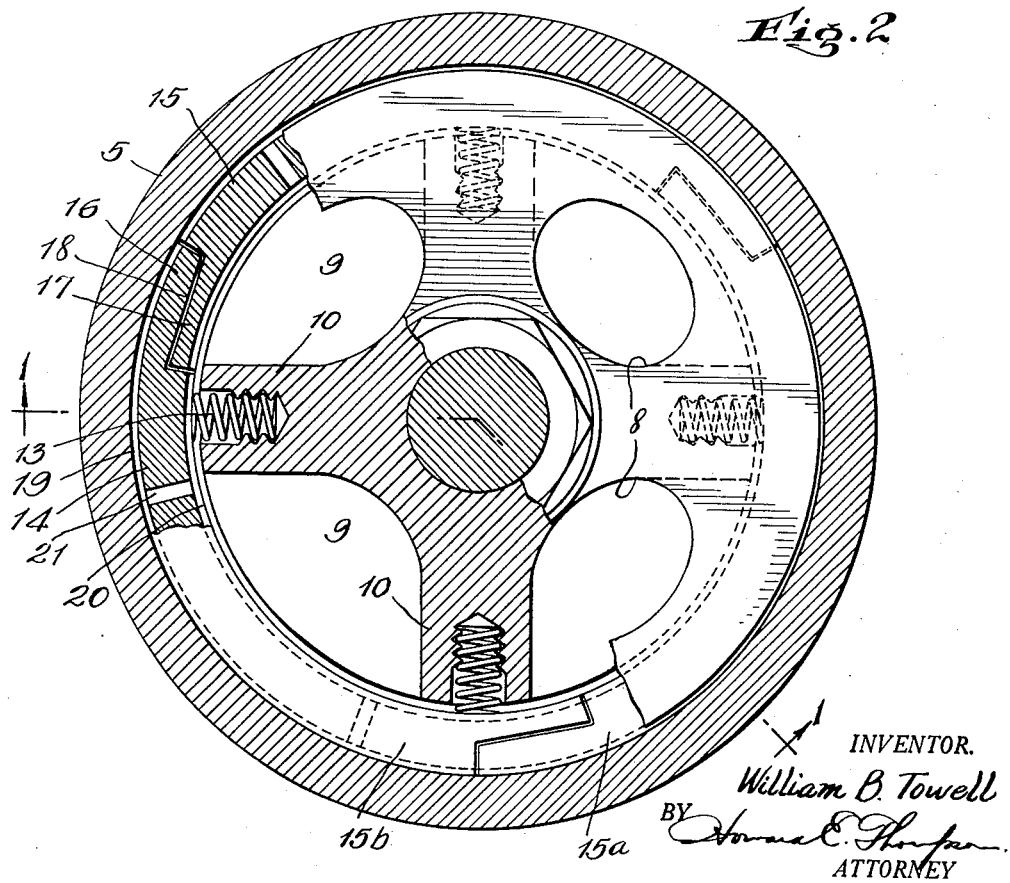
INVENTOR.
William B. Towell
BY
ATTORNEY Patented July 19, 1932

1,867,718

UNITED STATES PATENT OFFICE

WILLIAM B. TOWELL, OF JERSEY CITY, NEW JERSEY

SEALING RING

Application filed April 16, 1930. Serial No. 444,728.

This invention relates to rings employed in connection with pistons, plungers and the like for effecting a seat between the same and the walls of a cylinder or other body in connection with which the same reciprocates and to devices of this class used for example in connection with the reciprocating bodies of engines of various kinds and classes, pumps, compressors and the like; and the object of the invention is to provide means for transmitting the prevailing pressure disposed at either end of a reciprocating body upon the inner circumferential surface of the ring or rings employed to exert thereon outward radial pressure to effect and insure a proper seal between the reciprocating body and cylinder wall; a further object being to form said ring of a plurality of independent, arc-shaped sections having overlapped joints at adjacent ends thereof, each ring section being of the same general form and contour; a further object being to provide the outer bearing surface of the ring or the separate sections thereof with an annular groove, with means for placing said groove in communication with an inner annular chamber whereby the pressure exerted upon the inner surfaces of said rings may be exposed to some extent to the outer bearing surface thereof to somewhat relieve the outward pressure and to provide free movement of the rings in the cylinder; said rings also having on their inner surfaces annular grooves placed in communication with the first named grooves through radial ports in the separate ring sections; a further object being to provide within the ring groove of the piston or reciprocating body, a plurality of radial sockets with means for supporting coil springs in said sockets for exerting slight outward and radial pressure on said rings to normally maintain the same in engagement with the cylinder wall; and with these and other objects in view, the invention consists in a sealing ring or device of the class specified which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a transverse, sectional view of a plunger arranged in a cylinder showing two of my improved rings, the section being on the line 1—1 of Fig. 2; and, Fig. 2 is a broken, transverse section on the line 2—2 of Fig. 1.

For the purpose of illustrating one method of carrying my invention into effect, I have shown at 5 in Figs. 1 and 2 of the drawing, a part of a cylinder structure of an engine of any kind or class or to a pump or compressor, and at 6, I have shown a plunger or piston body arranged on a plunger or connecting rod 7. The body 6 is divided by a central annular and uninterrupted portion 6a into an upper surface 6b and a lower surface 6c. The upper surface has a series of ports 8 opening into chambers 9 which are subdivided one from the other by radial ribs 10, the ports 8 being elliptical in form as seen in Fig. 2 of the drawing.

The chambers 9 open outwardly through an annular ring groove 11 formed in the periphery of the upper end portion 6b of the body 6. In like manner ports 8a opening through the lower surface 6c of the body 6 communicate with chambers 9a similar to the chambers 9 and subdivided by ribs 10a one of which is shown in Fig. 1 similar to the ribs 10. The chambers open outwardly through an annular ring groove 11a. Centrally of the outer surfaces of the ribs 10—10a which open into the ring grooves 11—11a are apertures 12—12a the inner ends of which are threaded to receive and support coil springs 13—13a adapted to normally bear upon the inner surfaces of rings 14—14a supported in the grooves 11—11a.

As the rings 14—14a are both of similar structure and as only one of the rings is shown in detail in Fig. 2 of the drawing, the brief description of one ring will apply to the other. These rings are made up in a plurality of sections, and in Fig. 2 of the drawing, the ring 14 is shown composed of three similar sections 15, 15a and 15b. One end of each section has a projecting tongue 16 arranged at the outer peripheral surface of said section whereas the other end of each section has a similar tongue 17 disposed at the inner surface thereof and said tongues have interengaging and slightly beveled surfaces 18 to form a joint within and between said tongues. While these surfaces are shown separated in Fig. 2 of the drawing, it will be understood that in the use of the device, said surfaces will bear one upon the other to effect a seal therebetween, especially when exposed to the pressure in the cylinder 5 above and below the reciprocating body 6.

The outer bearing surfaces of the sections 15, 15a and 15b are provided with a relatively small peripheral groove arranged centrally thereof which forms on the complete ring an annular groove 19 and a similar annular groove 20 is formed on the inner surface of the ring, said grooves being placed in communication through ports 21, two of which are formed in each of the ring sections. It will therefore be apparent that the prevailing pressure to which the inner surfaces of the rings are subjected is transmitted to a slight extent to the outer surfaces of said rings or to the annular grooves 19 formed therein.

In the use of the device, it will be understood that as the body 6 reciprocates in the cylinder 5, the prevailing pressure which exists in said cylinder at opposite ends of the body 6 is exposed to the inner surfaces of the rings and serves to maintain said rings or the bearing surfaces thereof in firm engagement with the cylinder wall and to effect a positive seal between the body 6 and the cylinder which is modified and only to the extent of the annular grooves 19. In different uses of the apparatus, it will be understood that the pressure exerted may be through the medium of air, steam or fluids, depending entirely upon the particular type of apparatus in connection with which my invention is employed.

It will be understood that while I have shown certain details of construction for carrying my invention into effect, and have illustrated a specific arrangement of chambers 9—9a, ports 8—8a and ribs 10—10a in the reciprocating body 6, that my invention is not limited to this arrangement, and various other changes in and modifications of the construction herein shown and described may be made within the scope of the appended claims without departing from the spirit of my invention or sacrificing its advantages.

Having fully described my invention, what I claim as new and desire to secure by Letters Patent, is:—

1. A device of the class described comprising a body mounted to reciprocate in a cylinder structure, said body having an annular ring groove, a plurality of spoke-like ribs extending radially from the longitudinal axis of said body, the outer surfaces of said ribs being exposed to said ring groove and forming in said body between said ribs a plurality of large circumferentially spaced chambers opening into said ring groove between opposed sides of said ribs and opening outwardly through one end wall of said body, whereby the prevailing pressure in the corresponding end of said cylinder may be subjected to said chambers and ring groove, a sealing ring composed of a plurality of similar ring sections having overlapping end portions arranged in said ring groove upon said ribs and forming a closure for said chambers whereby the prevailing pressure in said chambers is exposed to the inner face of said ring.

2. A device of the class described comprising a body mounted to reciprocate in a cylinder structure, said body having an annular ring groove, a plurality of spoke-like ribs extending radially from the longitudinal axis of said body, the outer surfaces of said ribs being exposed to said ring groove and forming in said body between said ribs a plurality of large circumferentially spaced chambers opening into said ring groove between opposed sides of said ribs and opening outwardly through one end wall of said body, whereby the prevailing pressure in the corresponding end of said cylinder may be subjected to said chambers and ring groove, a sealing ring composed of a plurality of similar ring sections having overlapping end portions arranged in said ring groove upon said ribs and forming a closure for said chambers whereby the prevailing pressure in said chambers is exposed to the inner face of said ring, said ribs being arranged inwardly of the outer surface of said body and tensional means supported in the outer faces of said ribs cooperating with said ring to normally support the same in engagement with the wall of the cylinder.

3. A device of the class described comprising a body mounted to reciprocate in a cylinder structure, one end of said body having an annular ring groove, a plurality of spoke-like ribs extending radially from the longitudinal axis of said body, the outer surfaces of said ribs being exposed to said ring groove and forming in said body between said ribs a plurality of large circumferentially spaced chambers opening into said ring groove between opposed sides of said ribs and opening outwardly through one end wall of said body, whereby the prevailing pressure in the corresponding end of said cylinder may be subjected to said chambers and ring groove, a sealing ring composed of a plurality of similar ring sections having overlapping end portions arranged in said ring groove upon said ribs and forming a closure for said chambers whereby the prevailing pressure in said chambers is exposed to the inner face of said ring, the other end of said body having similar ring groove rib and chamber structure with a sealing device composed of separate ring sections disposed in the last-named groove and the inner and outer surfaces of said ring sections having circumferential grooves and radial parts in each ring section for placing the inner and outer grooves in communication with each other and with the chambers opening through opposite ends of said body.

In testimony that I claim the foregoing as my invention I have signed my name this 15th day of April 1930.

WILLIAM B. TOWELL.